(12) United States Patent
Amundsen et al.

(10) Patent No.: US 8,990,687 B2
(45) Date of Patent: Mar. 24, 2015

(54) DATABASE MONITOR REPLAY

(75) Inventors: Lance C. Amundsen, Foster City, CA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/561,384

(22) Filed: Jul. 30, 2012

(65) Prior Publication Data

US 2012/0304058 A1 Nov. 29, 2012

Related U.S. Application Data

(63) Continuation of application No. 11/290,877, filed on Nov. 30, 2005, now Pat. No. 8,261,189.

(51) Int. Cl.
*G06F 3/00* (2006.01)
*G06F 17/30* (2006.01)
*G06F 9/44* (2006.01)

(52) U.S. Cl.
CPC ........ *G06F 17/30876* (2013.01); *G06F 9/4443* (2013.01); *G06F 17/30587* (2013.01)

USPC .......... 715/704; 715/713; 715/715; 715/736; 715/737; 715/771

(58) Field of Classification Search
None
See application file for complete search history.

(56) References Cited

U.S. PATENT DOCUMENTS

| | | |
|---|---|---|
| 5,682,330 A | 10/1997 | Seaman et al. |
| 6,618,718 B1 | 9/2003 | Couch |
| 6,785,369 B2 | 8/2004 | Diamond et al. |
| 2003/0006999 A1 | 1/2003 | Carlson et al. |
| 2003/0182276 A1 | 9/2003 | Bossman et al. |
| 2004/0030685 A1 | 2/2004 | Helles et al. |
| 2004/0103088 A1 | 5/2004 | Cragun et al. |
| 2004/0103090 A1 | 5/2004 | Dogl et al. |
| 2005/0010578 A1 | 1/2005 | Doshi |
| 2005/0193376 A1 | 9/2005 | Harrison |
| 2006/0005132 A1 | 1/2006 | Herdeg, III |
| 2006/0106847 A1 | 5/2006 | Eckardt, III et al. |
| 2007/0124676 A1 | 5/2007 | Amundsen et al. |

*Primary Examiner* — Anil N Kumar
(74) *Attorney, Agent, or Firm* — Patterson & Sheridan, LLP

(57) ABSTRACT

Method, article of manufacture and apparatus for playing back recorded database activity in a graphical user interface. Chronologically ordered database event information is dynamically displayed in a user interface having user-selectable graphical elements associated with predefined playback controls.

15 Claims, 15 Drawing Sheets

DATABASE MONITOR REPLAY

CROSS-REFERENCE TO RELATED APPLICATIONS

This application is a continuation of co-pending U.S. patent application Ser. No. 11/290,877, filed Nov. 30, 2005. The aforementioned related patent application is herein incorporated by reference in its entirety.

BACKGROUND OF THE INVENTION

The present invention generally relates to monitoring database activity and particularly to a method, system, and program for presenting database activity in a graphic user interface using representative icons.

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns (formally denominated "attributes"). Reference is made to C. J. Date, *An Introduction to Database Systems,* 6th edition, Addison-Wesley Publishing Co. Reading, Mass. (1994) for an comprehensive general treatment of the relational database art.

An RDBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the RDBMS is not specified by the query. The method of query execution is typically called an execution plan, an access plan, or just "plan". There are typically many different useful execution plans for any particular query, each of which returns the required data set. For large databases, the execution plan selected by the RDBMS to execute a query must provide the required data at a reasonable cost in time and hardware resources.

To successfully implement an application that invokes queries, the RDBMS must provide a process to track or capture the database activity that is taking place within the system. Such processes are known in the art as "monitors". Monitors can include, but are not limited to, processes that track the execution of queries against the database. All of the information captured from these monitors can be stored in either a log file or in another storage medium that will allow for easy access to the data to perform any analysis. The results of these monitors can be analyzed to determine if the system is operating in an optimal manner. Queries that are not making the best use of the system resources can be identified for further analysis or tuning.

Database monitors capture large amounts of relevant data on activity and events in databases. The sheer amount of data that is logged by monitors makes analysis of more complex database activity exceedingly time consuming and difficult. Currently in the art, existing database monitor tools are used to analyze long running database queries and database resources such as pools and buffers being hardest hit by queries. These tools are used by database administrators (DBA) to optimize and tune databases for increased performance.

While existing database monitoring tools are of some use to DBAs, no tools currently exist in the art that cater to the application programmer Conventional database monitoring tools typically provide static information reflective of performance after query execution is complete. As the programmer is not concerned with database tuning, but rather how the application interacts with the database as a whole, the programmer needs a tool capable of displaying database interactions and behaviors as the application is interacting with said database.

Accordingly, there is a need for an improved method for analyzing and displaying database activity and interactions in a graphic user interface using a system of representative icons.

SUMMARY OF THE INVENTION

The present invention generally is directed to a method, system, and article of manufacture for presenting chronologically ordered database event information through a user interface.

One embodiment provides a method for presenting chronologically ordered database event information. The method generally includes displaying a user interface having user-selectable graphical elements associated with predefined playback controls. User input is received with respect to the graphical elements to invoke the predefined playback controls. In response to at least one of the user inputs, a recording, based on information captured by one or more database monitors monitoring the database system and which shows graphical objects being acted upon by chronologically ordered events, is played back in the graphical user interface. The graphical objects which are displayed include at least representative icons for tables within a database system.

Another embodiment provides a tangible computer-readable storage medium containing a program. When executed by a processor, the program performs operations including presenting chronologically ordered database information through a user interface. User inputs to a displayed graphical user interface containing user-selectable graphical elements associated with predefined playback controls are received to invoke the predefined playback controls. In response to at least one of the user inputs, a recording, based on information captured by one or more database monitors monitoring the database system, is played back in the graphical user interface which shows graphical objects being acted upon by chronologically ordered events. The graphical objects which are displayed include at least representative icons for tables within a database system.

Another embodiment provides a system for presenting chronologically ordered database event information in a user interface. The system generally includes a processor configurable with a graphical user interface having user-selectable graphical elements. The graphical elements are associated with predefined playback controls. User inputs to a displayed graphical user interface containing user-selectable graphical elements associated with predefined playback controls are received to invoke the predefined playback controls. In response to at least one of the user inputs, a recording, based on information captured by one or more database monitors monitoring the database system and which shows graphical objects being acted upon by chronologically ordered events, is played back in the graphical user interface. The graphical objects which are displayed include at least representative icons for tables within a database system.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
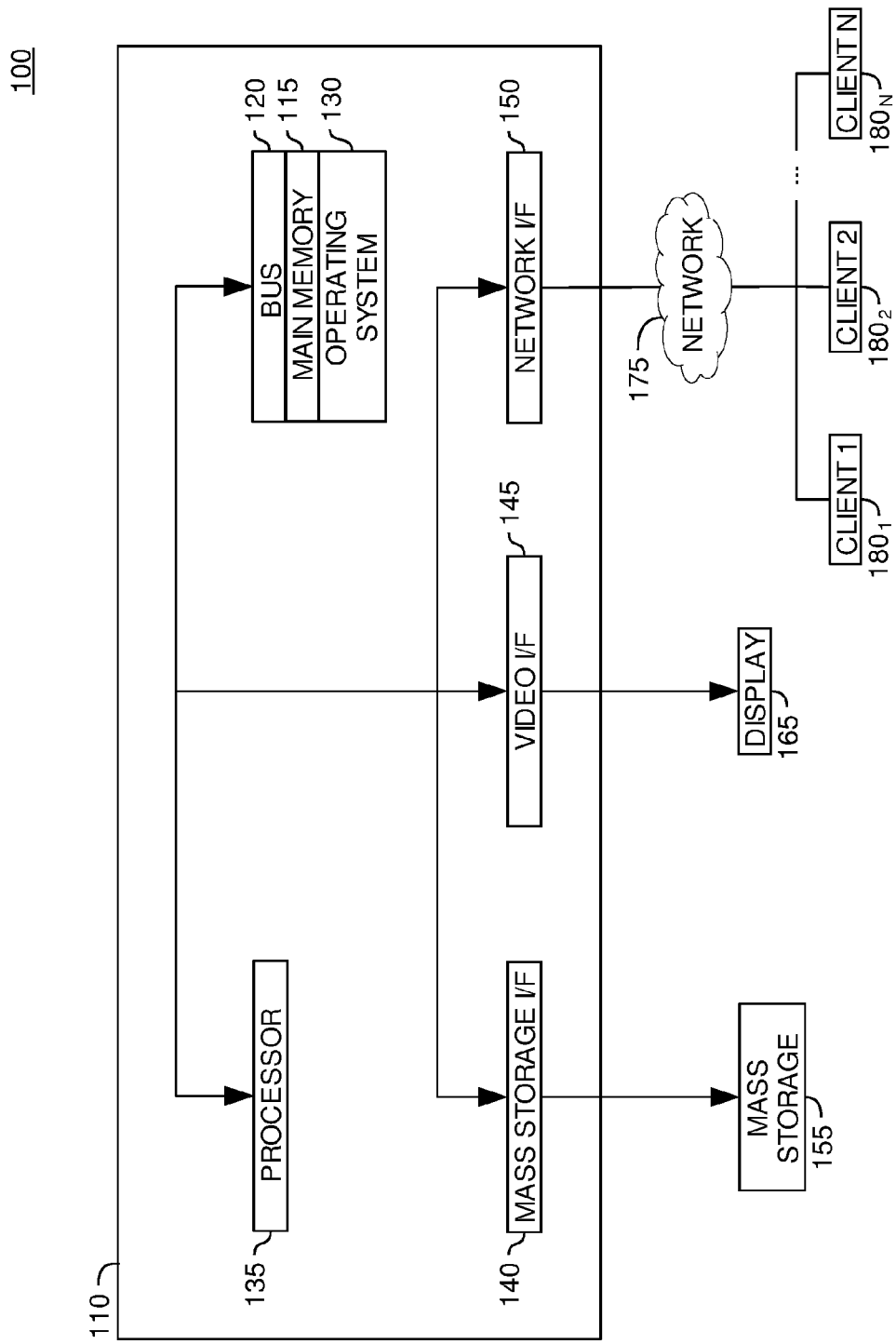
FIG. 1 is a general purpose computer system illustratively utilized in accordance with the invention.

The present invention generally provides methods, apparatus and articles of manufacture for displaying information logged by a database monitor over time using a Graphical User Interface (GUI). In one embodiment, the logged information is output by a GUI which displays objects (e.g., icons, graphs, text) representative of various constituent entities of a database, such as tables, columns and rows. In one embodiment, the GUI includes playback controls allowing the user to control the various aspects of the manner in which the logged information is played back. It is also contemplated that the manner in which attributes of the displayed objects are exposed is configurable by the user. In one aspect, displaying such information makes it possible for a user to see an application's effects on the database as a system, as compared to monitoring tools that simply monitor individual query execution times. With the data exposed by a monitoring tool of the present invention, a user would then be able to make changes to application code to better utilize available database resources.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Physical View of Environment

FIG. 1 shows a computer 100 (which is part of a computer system 110) that becomes a special-purpose computer according to an embodiment of the invention when configured with the features and functionality described herein. The computer system 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer 100 could include a number of operators and peripheral systems as shown, for example, by a mass storage interface 140 operably connected to a storage device 155, by a video interface 145 operably connected to a display 165, and by a network interface 150 operably connected via a network 175 to the plurality of networked devices 180 (which may be representative of the Internet). Although storage 155 is shown as a single unit, it could be any combination of fixed and/or removable storage devices, such as fixed disc drives, floppy disc drives, tape drives, removable memory cards, or optical storage. The display 165 may be any video output device for outputting viewable information.

Computer 100 is shown comprising at least one processor 135, which obtains instructions and data via a bus 120 from a main memory 115. The processor 135 could be any processor adapted to support the methods of the invention. In particular, the computer processor 135 is selected to support the features of the present invention. Illustratively, the processor is a PowerPC processor available from International Business Machines Corporation of Armonk, N.Y.

The main memory 115 is any memory sufficiently large to hold the necessary programs and data structures. Main memory 115 could be one or a combination of memory devices, including Random Access Memory, nonvolatile or backup memory, (e.g., programmable or Flash memories, read-only memories, etc.). In addition, memory 115 may be considered to include memory physically located elsewhere in a computer system 110, for example, any storage capacity used as virtual memory or stored on a mass storage device (e.g., direct access storage device 155) or on another computer coupled to the computer 100 via bus 120. Thus, main memory 116 and storage device 155 could be part of one virtual address space spanning multiple primary and secondary storage devices.

The operating system 130 is any master control program that manages internal functions of the computer system 110 and provides a means to control the operations of computer system 110. Operating system 130 could be one or a combination of master control programs, including Windows® by Microsoft, OSX® by Apple, or Linux. Linux is a trademark of Linus Torvalds in the US, other countries, or both. In addition, operating system 130 may be considered to be located elsewhere in a computer system 110, for example, stored on a mass storage device (e.g., direct access storage device 155) or on another computer coupled to the computer 100 via bus 120.

Figure 2:
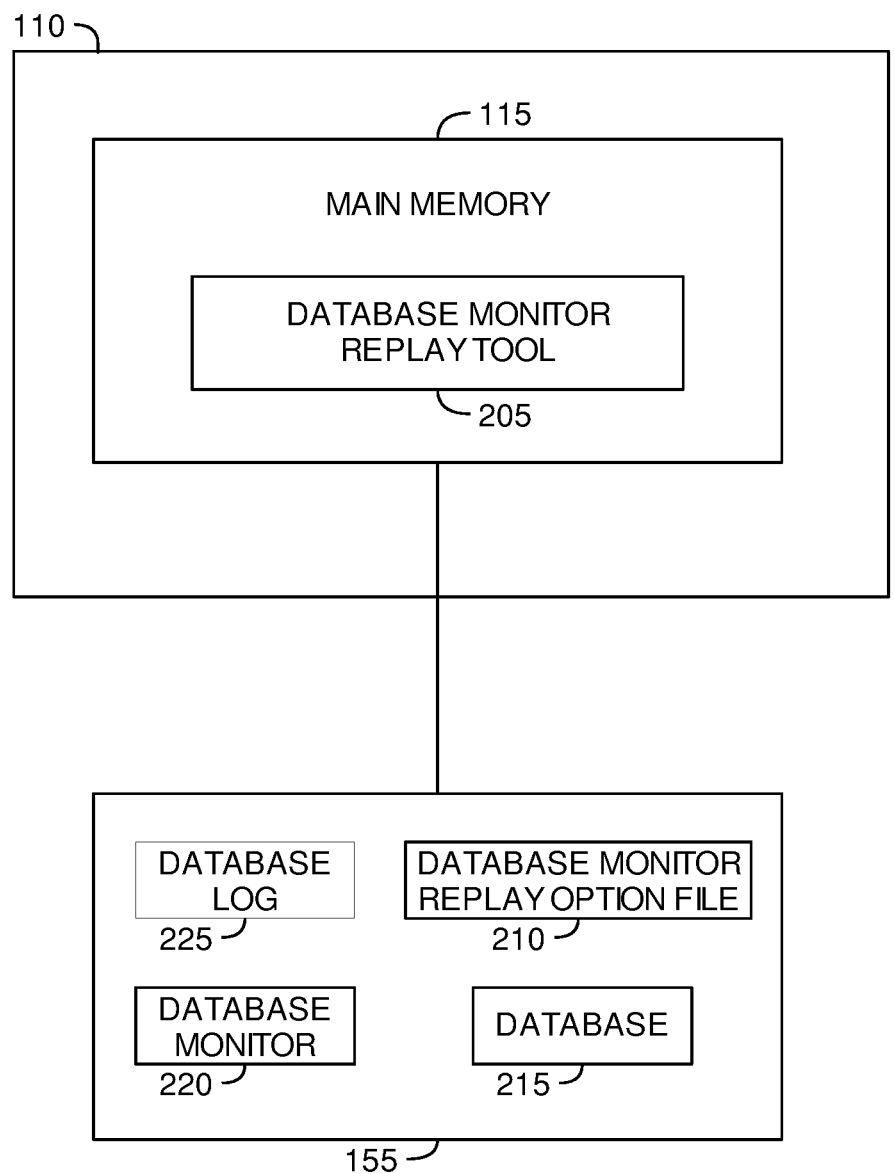
FIG. 2 is a relational view of the components of the invention according to one embodiment.

Referring now to FIG. 2, a relational view of a data processing environment 200 is shown, according to one embodiment of the invention. In one embodiment, the data processing environment 200 may be implemented in the computer system 110 described above with respect to FIG. 1. Accordingly, components described above will be identified by like reference numbers. Illustratively, the environment 200 includes a database 215 (which may be on the storage device 155). The environment 200 additionally includes a database monitor application 220. The database monitor application 220 monitors the database 215 and records (logs) events happening in the database to a database log file 225 (referred to as dbmon file 225). A database monitor replay tool 205 (referred to as dmr tool 205) is configured to access the log file 225 and playback the recorded database activity through a graphic user interface (GUI) 230. In one embodiment, the dmr tool 205 references a dmr tool option file 210 (referred to as option file 210), which may be stored on the storage device 155. Generally, the option file 210 defines various attributes of the manner in which the database monitor replay tool 205 exposes (displays) the recorded log information during playback. Is contemplated that, at least in one embodiment, the database monitor application 220 and the option file 210 are user configurable. For example, a user (e.g., an administrator) may specify which metrics the database monitor application 220 monitors and logs. Likewise, a user may also configure the option file 210 in order to effect how the logged information will be exposed during playback, as will be described in more detail below. Although only one database and database monitor application 220 are shown, is contemplated that the environment 200 may include a plurality of databases and/or database monitors. For example, each database or set of databases may be monitored by water more database monitors. Each monitor may be configured to monitor and log different metrics. Further, the databases may be implemented according to any known or unknown schema, such as a relational or hierarchical schema.

Application Flow

Figure 3:
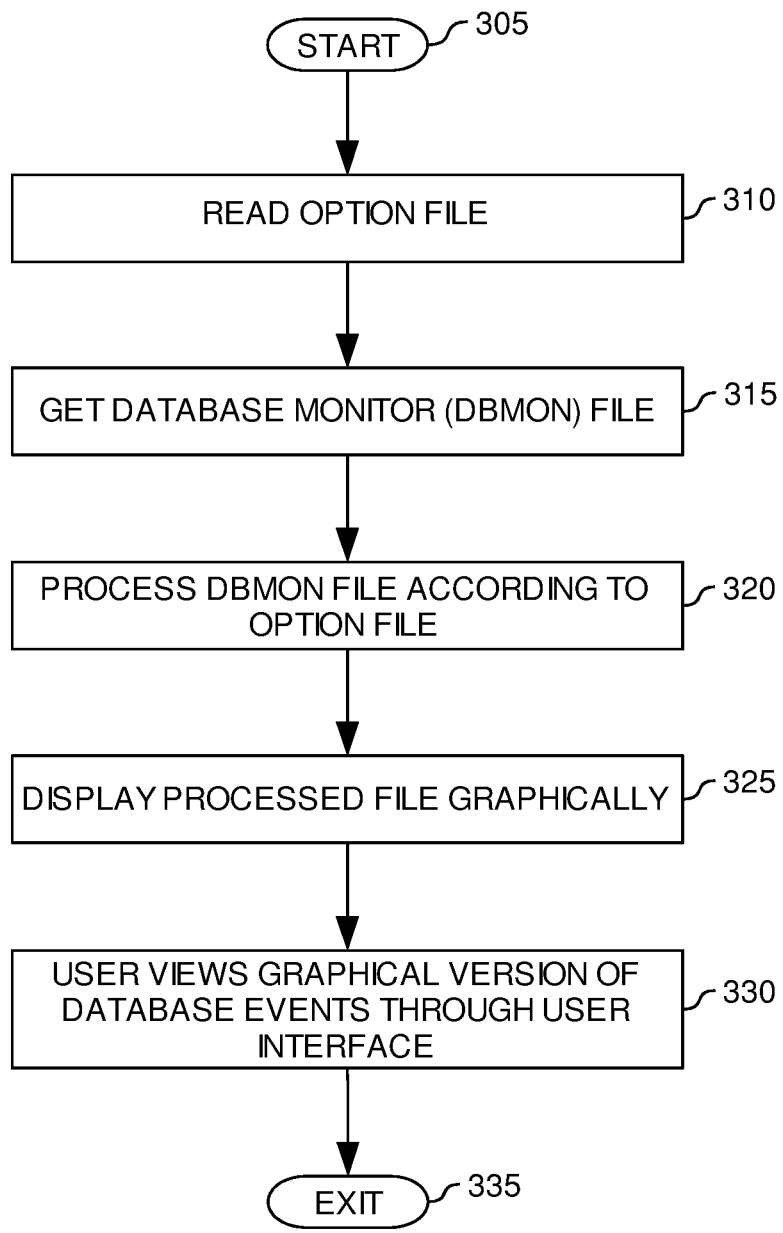
FIG. 3 is a flow chart illustrating the operation of a runtime component.

FIG. 3 is a flow chart illustrating the operation of a runtime component. Components described above with reference will be identified by like reference numbers. In one embodiment of the invention, the application flow begins at step 305, in response to a user executing the dmr tool 205. The dmr tool 205 reads the option file 210 in step 310 to obtain the collection of user-selected processing directives (options) for use by the dmr tool 205 in subsequent processing steps. At step 315, the dmr tool 205 accesses the dbmon file 225 and then processes the dbmon file 225 according to the directives contained in the option file 210 in step 320. The dmr tool 205 then displays the processed dbmon file 225 results to the user 330 as a series of graphical database events displayed chronologically through time.

Relational View of Environment

Figure 4:
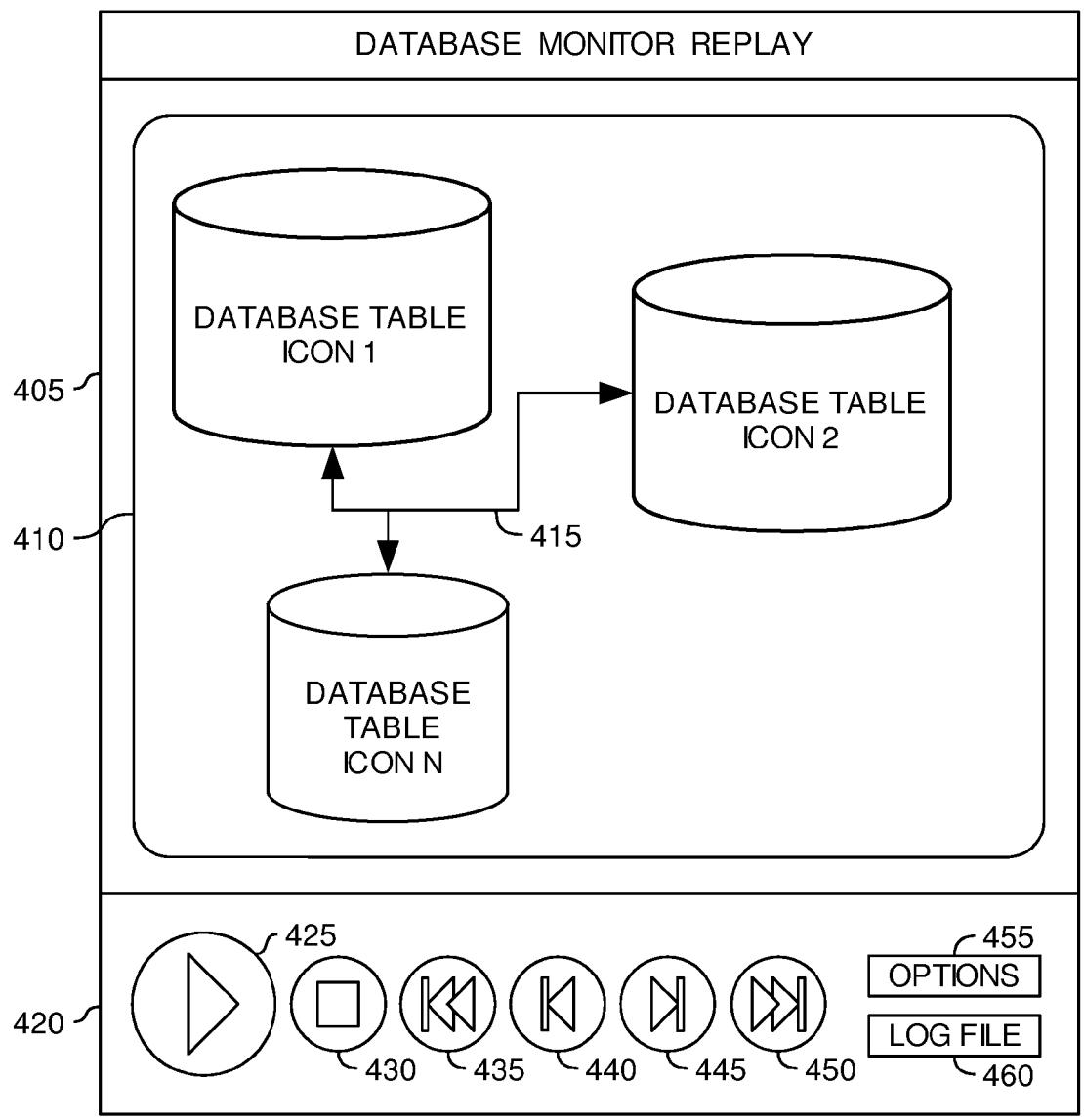
FIG. 4 is a relational view of software components of one embodiment of the invention.

FIG. 4 shows one embodiment of a screen 410 of a GUI 230 of the dmr tool 205. Components described above will be identified by like reference numbers. This user interface 400 provides a mechanism for playing back recorded database events (referred to as recorded events) as a series of representative icons with operational controls for, e.g., moving forwards and backwards within the chronology of recorded events. A screen 410, in one embodiment, displays a plurality of database table icons 415$_1$, 415$_2$, 415$_N$ (three shown by way of example; collectively referred to as database table icon 415). In one embodiment, the GUI 230 can be used to display a representation of any portion of a database as obtained from processing a dbmon file 225. Chronologically ordered events from a processed dbmon file 225 using database table icon 415, with various configured recognizable attributes applied to the icon, may appear in the graphic user interface display 410. In one embodiment of the invention, each time a database table is accessed by the database, (usually, but not always, as a result of a SQL query being executed against the table) a representative database table icon 415 will appear in the graphic user interface display 410. Certain database activities with respect to the database table will be manifested by visually recognizable attributes of the representative database table icon 415. These visually recognizable attributes and the recorded events which are associated with them can be pre-configured in the dmr tool 205. In particular, as described above, these aspects of playback can be specified in the options file 210. Once the event which caused the database table icon 415 to appear in the graphic user interface display 410 ends, the database table icon 415 could disappear from the graphic user interface display 410. Thus, the graphic user interface display 410 could contain a plurality of appearing and disappearing database table icons 415 as the dbmon file 225 was viewed chronologically through the dmr tool 205. Additionally, while present in the graphic user interface display 410, attributes of the icons 415 could change, reflecting various database activities impacting the respective icons 415.

To control the playback progress of the chronological progression events in the dbmon file 225, a series of control objects may be present in the graphic user interface display 410. Illustratively, such control objects are manifested in FIG. 4 as a playback control panel 420 of the graphic user interface display 410. In one embodiment, these control objects would allow a user to control the speed in which various database table icons 415 would appear in the graphical user interface display 410 in response to recorded events.

In one embodiment of the invention, a play button control object 425 is used to start the chronological progression of database table icon 415 events in the graphic user display 410 in real time. A stop button control object 430 is used to stop or pause the playback of dbmon file 225 events. A combination of fast rewind button control object 435 and rewind button control object 440 can be used to control the speed of viewing the events displayed in the graphic user interface display 410 in reverse motion. A combination of fast forward button control object 450 and forward button control object 445 can be used to control the speed of viewing the events displayed in the graphic user interface display 410 in fast forward motion. The buttons and related functions shown in FIG. 4 are merely illustrative. Other functions include any known or unknown playback functions including a skip ahead that allows a user to jump directly to a predefined point in the recording (e.g., such as where the recording is indexed by chapter and the user may linearly skip to sequential chapters by clicking a skip ahead button). Likewise, a chapter selection feature may be exposed to the user via the graphic user interface display 410 that allows the user to select a specific chapter (or other indexed location in the recording). In one embodiment, an option button control object 455 is present, that, when clicked, provides access to an option configuration screen (discussed in more detail in FIG. 13). A log file button control object 460 is provided below the option button control object 455 which could present an operator of the application with a selection of available dbmon files 225 for processing and display by the dmr tool 205. Although a selection of control object buttons are shown in FIG. 4, it is understood that other control devices such as a slider bar could be used to control the graphical progress through the dbmon file 225.

Figure 5:
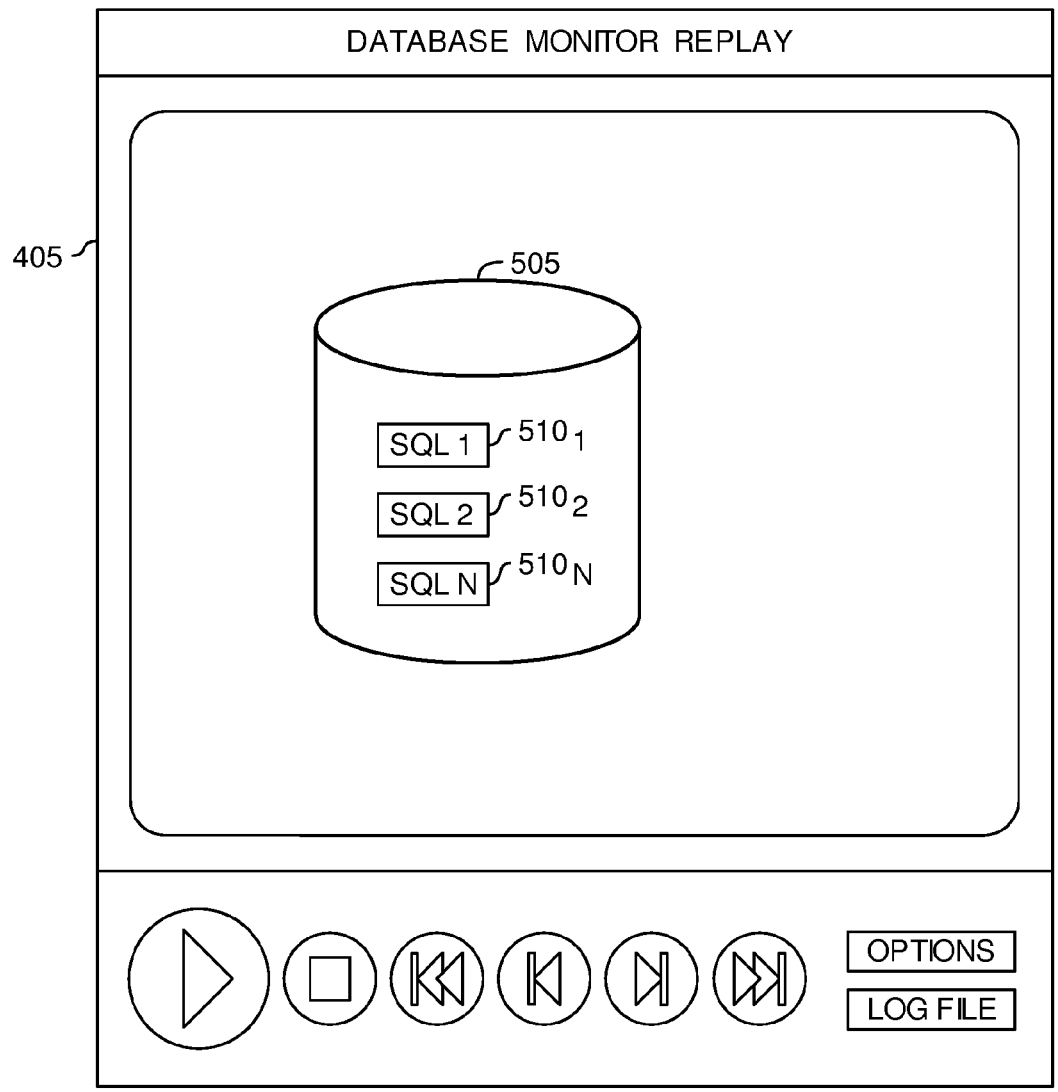
FIG. 5 is a relational view of software components of one embodiment of the invention.

FIG. 5 shows one embodiment of a user interface screen 500 of the dmr tool GUI 230. Components described above will be identified by like reference numbers. In one embodiment of the invention, each time a database table is accessed in the database, a database table icon 505 will appear in the user interface screen 500. In response to an SQL query being executed against a database table, the database table icon 505 may display a plurality of SQL query sub icons $510_1$, $510_2$, $510_N$ (three shown by way of example; collectively referred to as SQL query sub icons 510) for each SQL query currently executing against the database table represented by the database table icon 505. A SQL query sub icon 510 could appear in the database table icon 505 as the SQL query represented by the SQL query sub icon 510 is being executed and disappear from the database table icon 505 once the SQL query represented by the SQL query sub icon 510 has completed execution.

Figure 6:
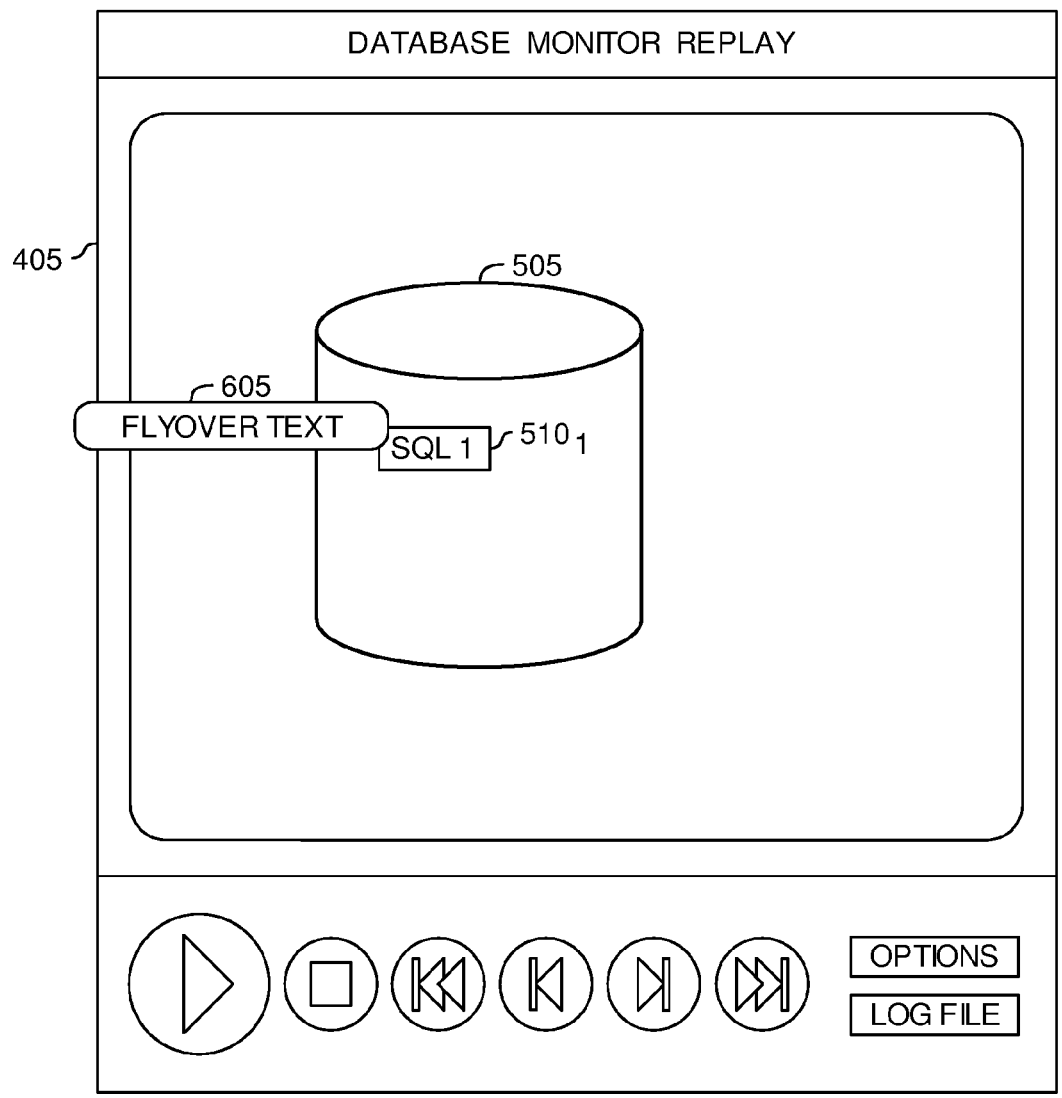
FIG. 6 is a relational view of software components of one embodiment of the invention.

FIG. 6 shows another embodiment of a user interface screen 600 of the GUI 230. Components described above will be identified by like reference numbers. In one embodiment of the invention, dmr tool 205 could be configured so that moving a mouse or other pointing device over a SQL query sub icon 510 or database table icon 505 causes a flyover text balloon 605 to appear. This flyover text balloon 605 could contain information about the database table represented by the database table icon 505, for example, table name or the number of records in the table. The flyover text balloon 605 could also contain a plurality of information about the SQL query sub icon 510, for example, the SQL query statement itself or type of query (SELECT, INSERT, UPDATE, or DELETE). In any case, it is contemplated that other information could be displayed in the flyover text balloon 605.

Figure 7A:
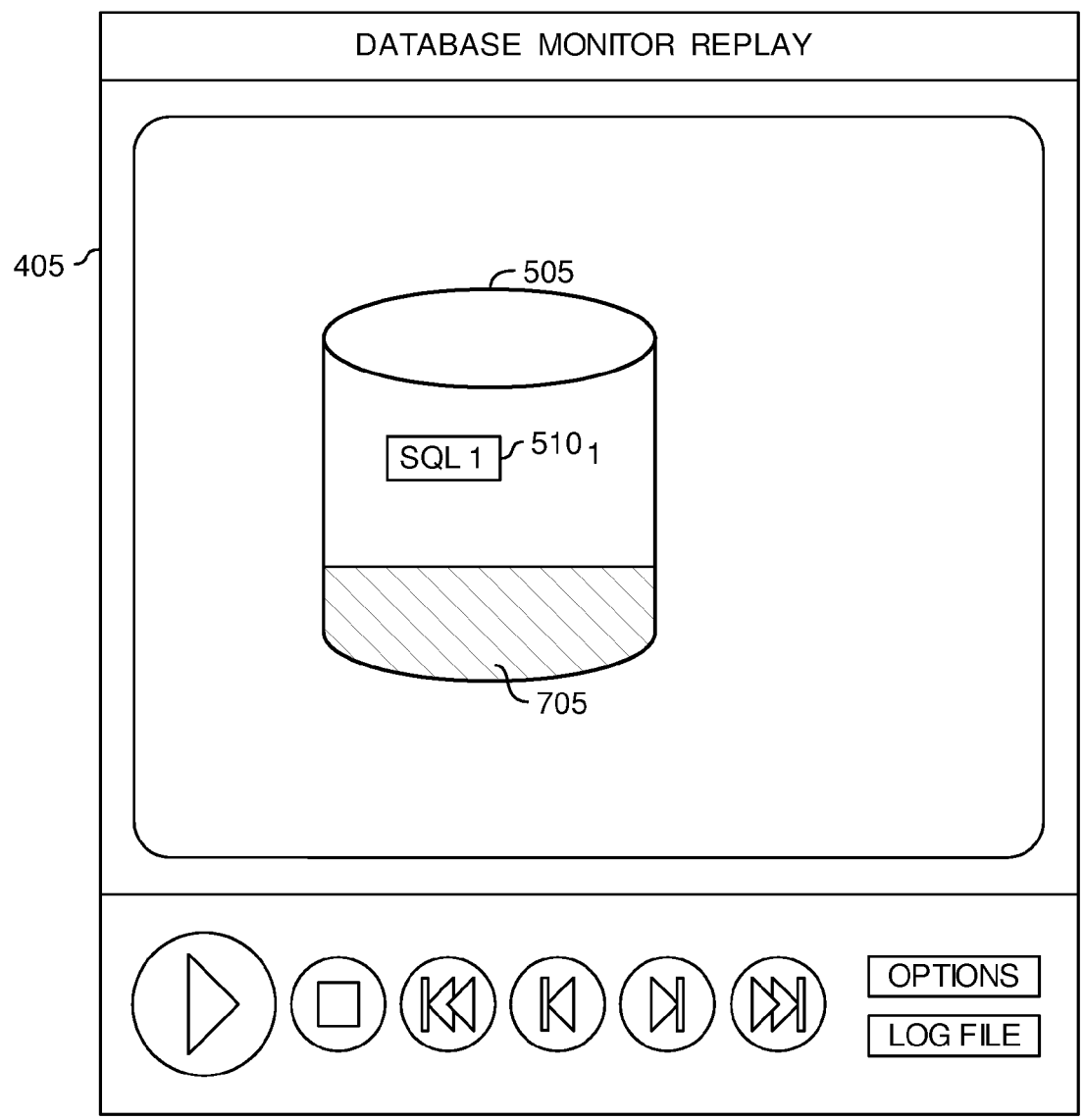
FIGS. 7A, 7B, and 7C are relational views of software components of one embodiment of the invention.
Figure 7B:
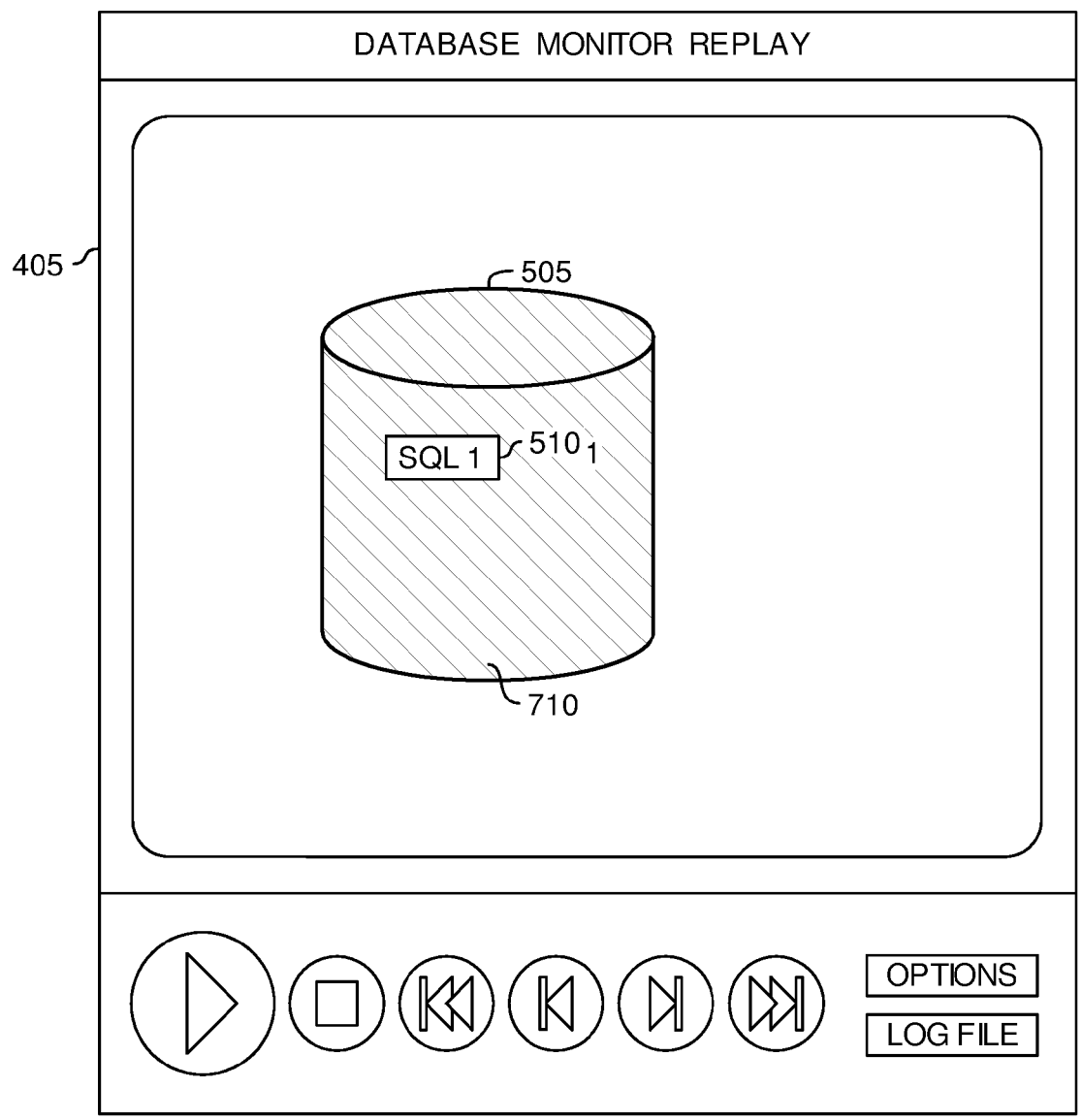
Figure 7C:
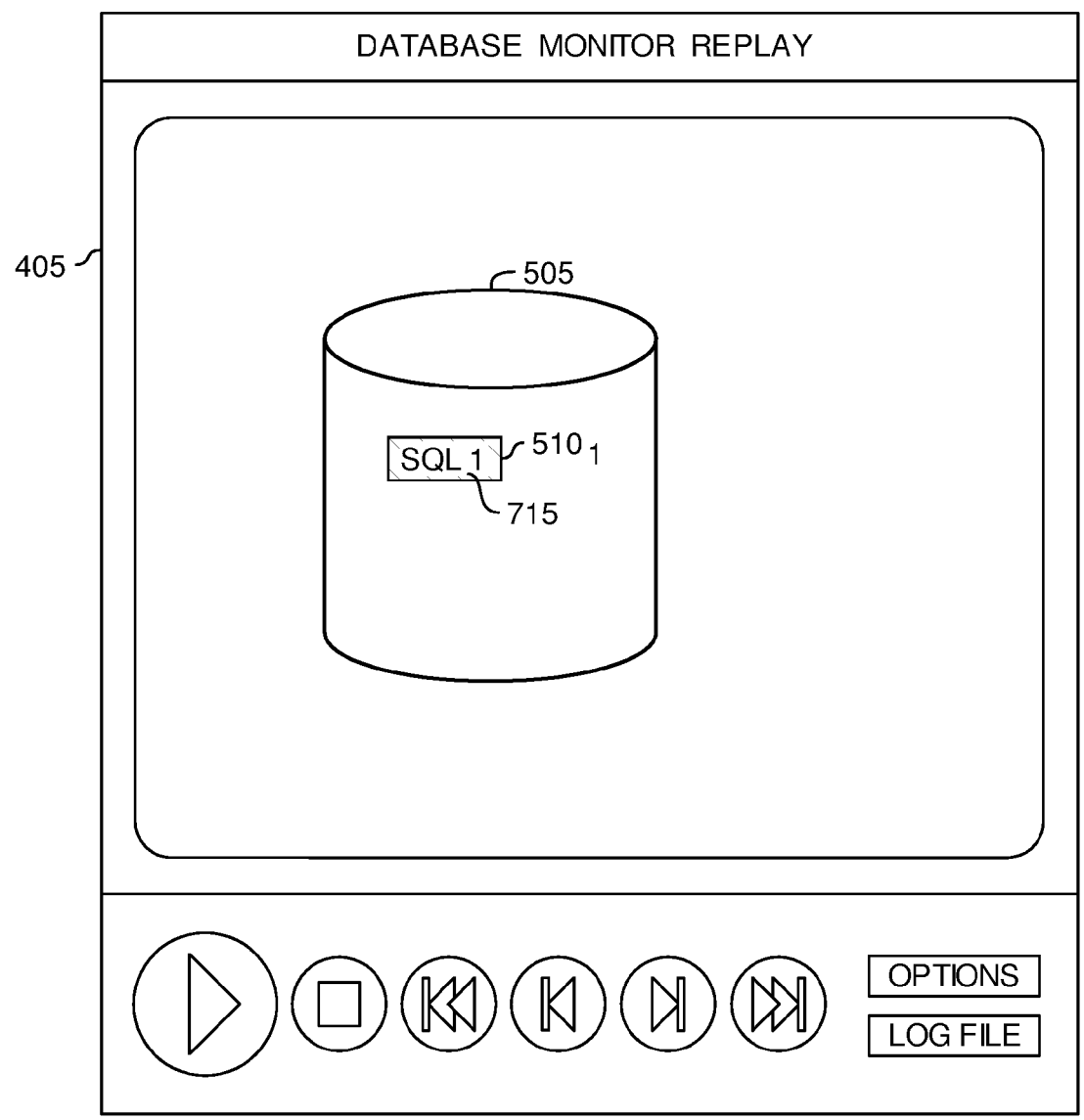

FIGS. 7A, 7B and 7C show three views of a user interface screen 700 of the GUI 230. Components described above will be identified by like reference numbers. In one embodiment of the invention, the dmr tool 205 could be configured so that a database table icon 505 could affect a color change based on any one of a plurality of record events. FIG. 7A, for example, displays a database table icon 505 with a different colored section of the icon 705 (grey is used in the figure, although it is contemplated that any desired color would be applicable). In the FIG. 7A example, the percentage of the database table icon 505 that appeared colored could signify the percentage of records in the represented table that were affected by the SQL statement represented by SQL sub query icon 510. The greater the percentage of the database table icon 505 that was filled with color, the more records in the represented database table that were affected by the SQL statement. In another embodiment, the colored section 705 could indicate the type of SQL query (SELECT, INSERT, UPDATE or DELETE) represented by SQL sub query icon 510. It is contemplated that in the case of the colored section representing the SQL type, multiple colors could appear in the database table icon 505 simultaneous when multiple SQL queries were being executed against the database table represented by the database table icon 505.

FIG. 7B illustrates another contemplated example of displaying the type of SQL query (SELECT, INSERT, UPDATE or DELETE) or database event affecting the database table represented by database table icon 505. Components described above with reference will be identified by like reference numbers. Rather than some portion of the database table icon 505 changing color or colors in response to a particular type of SQL statement or other database event as depicted in FIG. 7A, the entire icon could be configured to change color, thus making it more obvious to a user of the application when a particular event or class of event had occurred to the database table represented by the database table icon 505. It is contemplated that using a pattern or texture instead of a color would also server to indicate this information to the user.

FIG. 7C illustrates another example of displaying the type of SQL query (SELECT, INSERT, UPDATE or DELETE) or database event affecting the database table icon 505. Components described above with reference will be identified by like reference numbers. Rather than some portion of the database table icon 505 changing color or colors in response to a particular type of SQL statement or other database event as depicted in FIG. 7A, the SQL query sub icon 510 could be configured to change to some color or plurality of colors as depicted in SQL query sub icon 715. It is contemplated that configuring the dmr tool 205 in such a way would allow a user of the invention to see the type of SQL query being executed by the SQL statement represented by the SQL query sub icon 615 while leaving the remaining space in the database table icon 505 free for additional database event depiction illustrated in either FIG. 7A or FIG. 7B.

Figure 8:
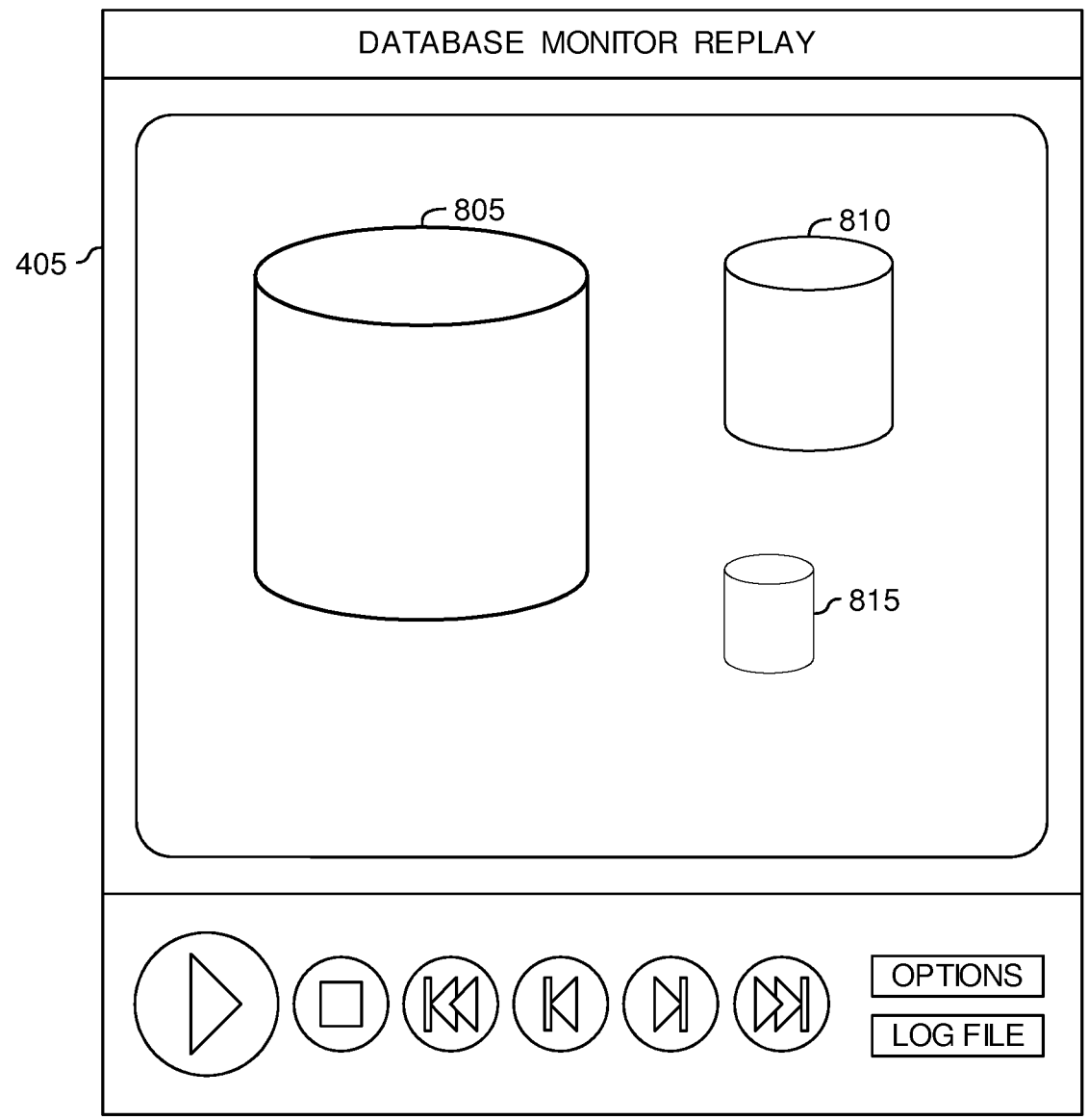
FIG. 8 is a relational view of software components of one embodiment of the invention.

FIG. 8 shows one embodiment of a user interface screen 800 of the GUI 230. Components described above will be identified by like reference numbers. In one embodiment of the invention, the size of the database table icon 505 could be configured to depict the number of records in the database table represented by the database table icon 505 as a relation of relative size to another depicted database table icon 505. For example, in FIG. 8, a database table icon 805 which represents a database table with a very large number of rows is depicted. A database table with less rows than the table represented by database table icon 805 is depicted by the small database table icon 810. A database table with even less rows than the database table depicted by database table icon 810 is depicted by the much smaller database table icon 815. In another embodiment of the invention, this relative icon sizing could be used to represent other properties of database tables such as the size or number of indexes on a given database table relative to other database tables or the amount of SQL queries or other database events accessing a database table relative to other database tables. While these two alternative applications for the sizing of a database table icon 505 are provided, other applications can be contemplated for the invention.

Figure 9:
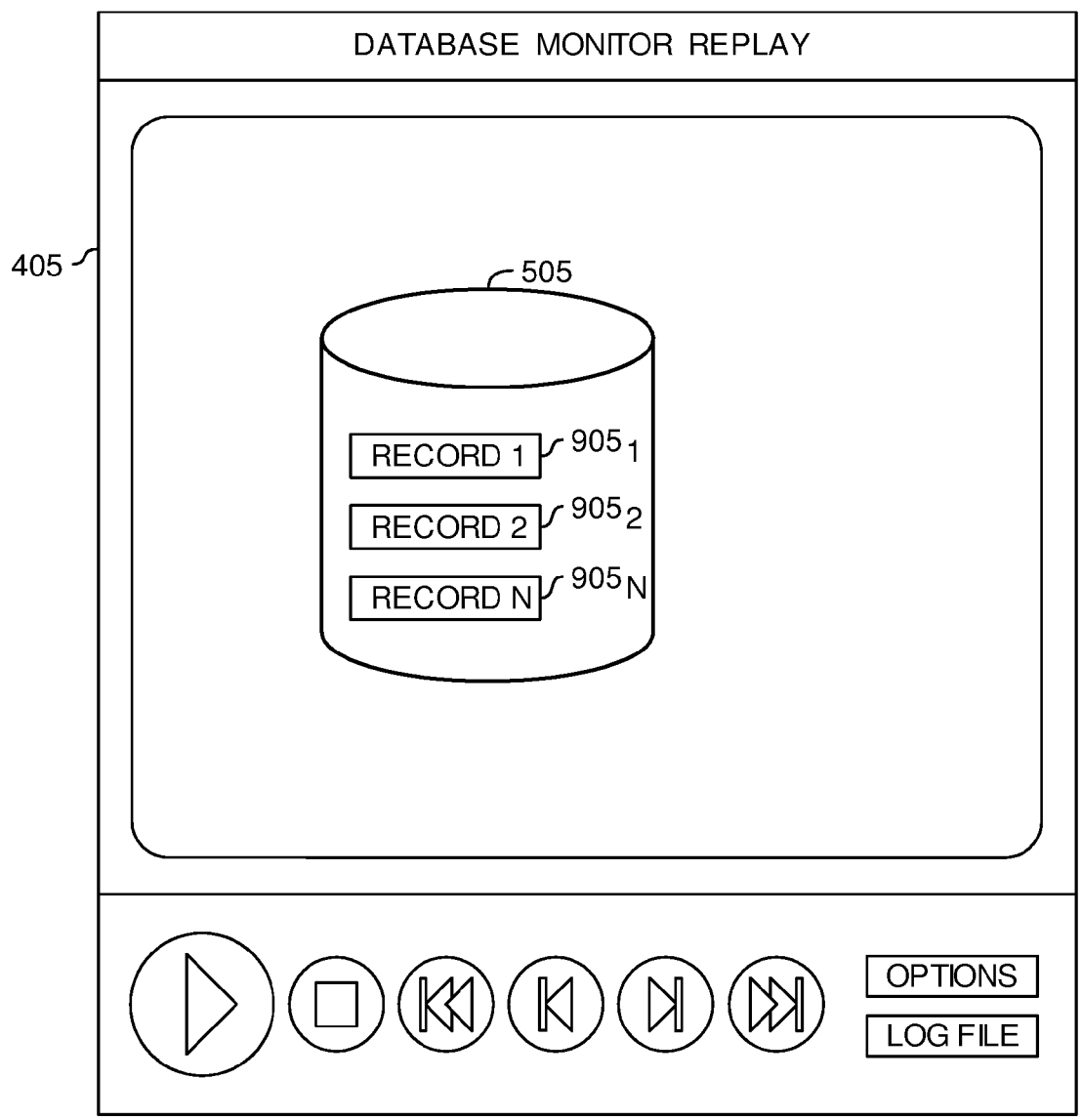
FIG. 9 is a relational view of software components of one embodiment of the invention.

FIG. 9 shows another embodiment of a user interface screen 900 of the GUI 230. Components described above will be identified by like reference numbers. In one embodiment of the invention, it may be useful to display the actual records currently being affected in a database table represented by the database table icon 505 in response to some SQL query or other database event. The dmr tool 205 could be configured to display a plurality of database table row icons 905$_1$, 905$_2$, 905$_N$ (three shown by way of example; collectively referred to as database table row icons 905), one for each row in the database table represented by database table icon 505 being affected at the time the SQL query or database event occurs.

Figure 10:
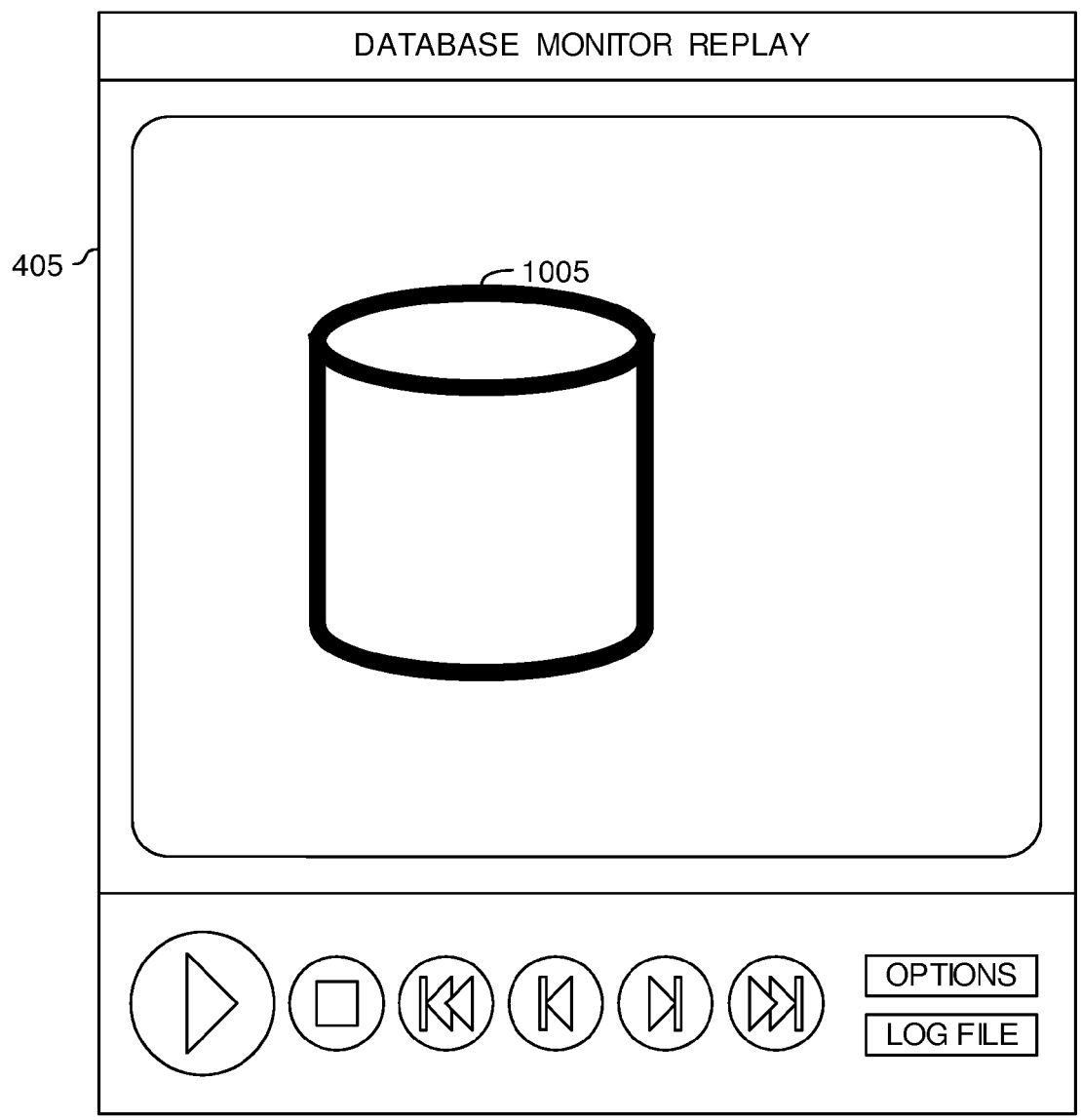
FIG. 10 is a relational view of software components of one embodiment of the invention.

FIG. 10 shows another embodiment of a user interface screen 1000 of the GUI 230. Components described above will be identified by like reference numbers. In one embodiment of the invention, the dmr tool 205 could be configured to change the border of a given database query icon 1005 in response to a particular database event. This change of icon border color could happen as a result of a plurality of different database events. For example, if the event is triggered in response to a request or SQL query by a particular database server user account the dmr tool 205 could cause the border of the database table icon 1005 to change to a configured color or colors, thereby distinguishing this icon from the database table icons 505 that are not currently being affected by the same database server user account. Likewise, It is contemplated that the dmr tool 205 could be configured to change the border of a database table icon 505 in response to some specified combination of events. For example, the dmr tool 205 could be configured to change the border of a database table icon 505 to some color if a row in the representative database table was locked while another SQL query was trying to UPDATE the locked row.

Figure 11:
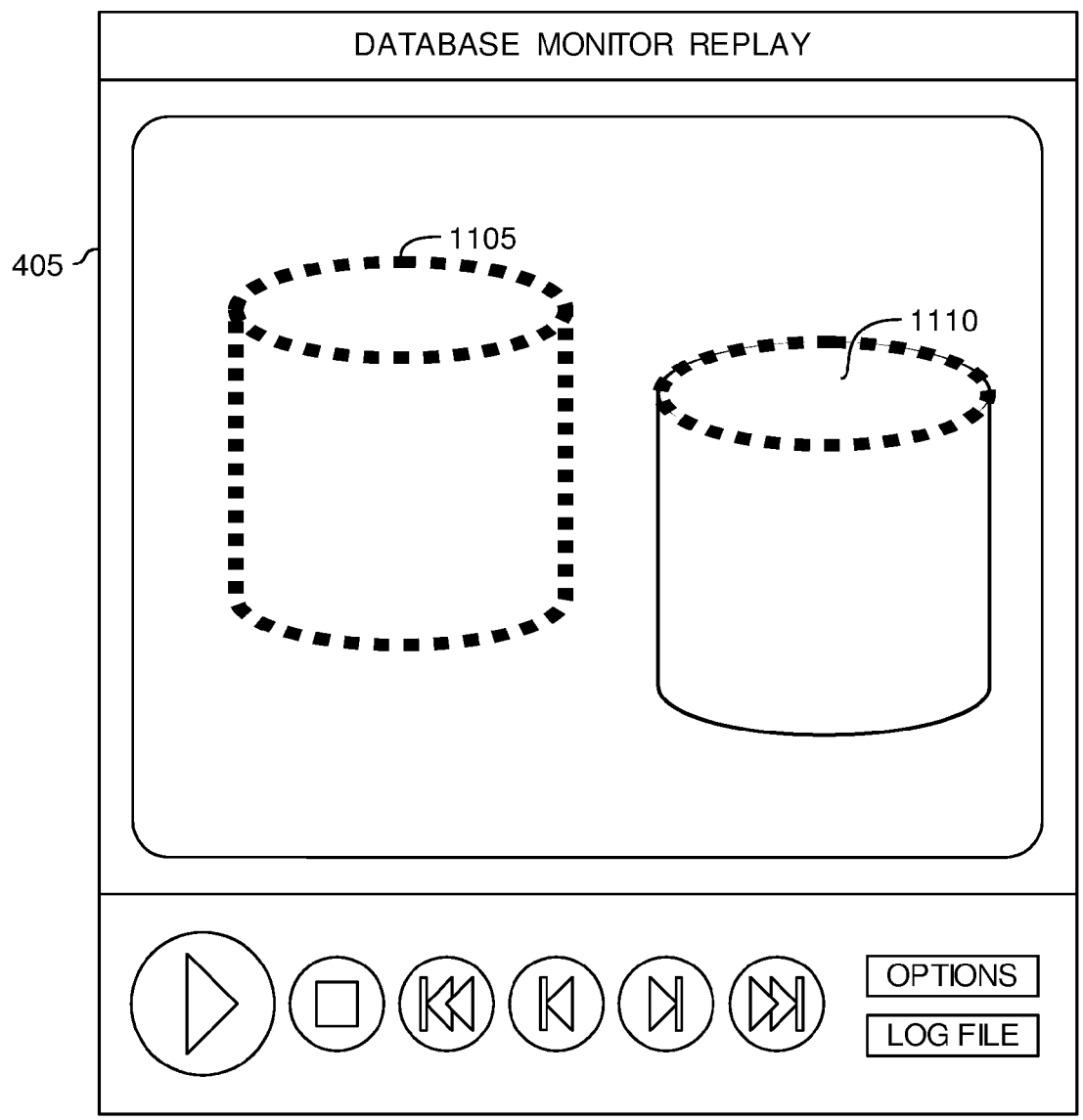
FIG. 11 is a relational view of software components of one embodiment of the invention.

FIG. 11 shows another embodiment of a user interface screen 1100 of the GUI 230. Components described above will be identified by like reference numbers. This user interface environment illustrates how the objects can be visually manipulated to allow the user to distinguish the particular query operations being performed with respect to represented database tables. For example, database tables that are accessed primarily in one way, by SQL query SELECT statements for example, could have the border of their representative database table icon 1105 changed to reflect this state, thereby distinguishing these icons from the database table icons of tables that are accessed differently. For example, a more typical database table that is accessed by a range of SQL query types (SELECTs, INSERTs, UPDATEs or DELETEs) would not have a changed border in the example described above. Alternatively, some portion of the database table icon 1110 (in this example, the top portion) could be configured by the dmr tool 205 to change color to show that the database table represented by database table icon 1110 is being accessed by the database in primarily one particular manner. Such information could provide crucial feedback on how a particular table is accessed over time in the database.

Figure 12:
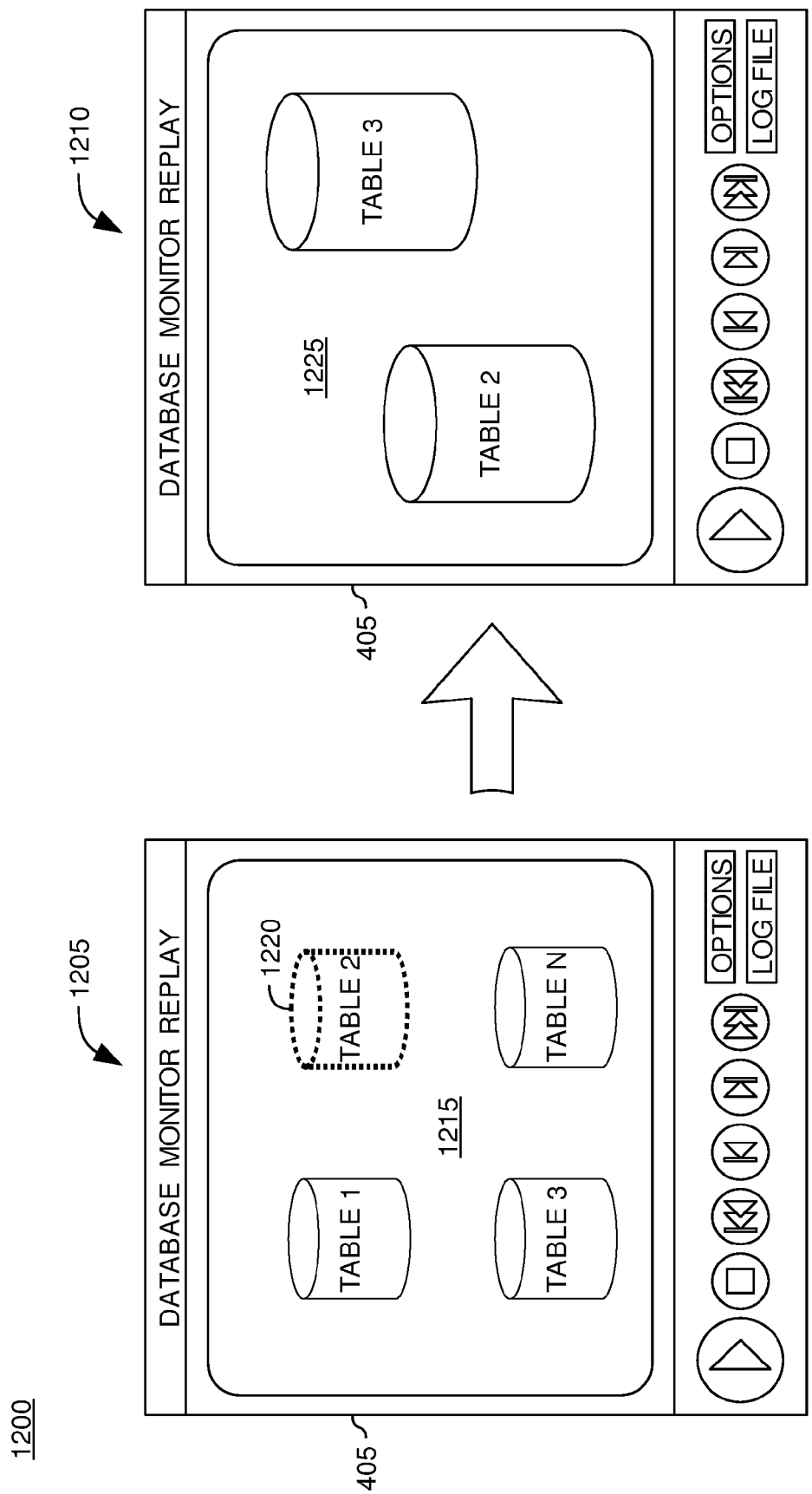
FIG. 12 is a relational view of software components of one embodiment of the invention.

FIG. 12 shows another embodiment of a user interface screen 1200 of the GUI 230. Components described above will be identified by like reference numbers. This user interface environment illustrates how the objects can be visually manipulated to alert the user when recorded events of particular significance are occurring. One embodiment of the invention in FIG. 12 depicts an event when a given database table icon 1220 blinks 1205 to alert a user that a particular event is occurring. After the user has clicked on the database table icon 1220, the dmr tool 205 displays a close up 1210 of the affected database table icons 1225. For example, the dmr tool 205 could be configured to blink the database table icon 1220 (or bring the attention of the user to that area of the screen by highlighting the whole icon, for example) in a plurality of other database table icons 1215 to signify that a particular event is occurring (a database rollback, for example). In another embodiment, the dmr tool 205 could be configured to pause the graphic user interface display 410 until the user addresses the database event which was responsible for the pause. It is contemplated that other mechanisms such as blinking the entire display of the dmr tool 205 or playing a sound could be used to alert the user that a particular recorded event is occurring.

In one embodiment, clicking on the blinking database table icon 1220 with a mouse or other input device could cause the graphic user interface display 410 to zoom in on the database table icon and any other associated database table icons 1225 affected in the event (the rollback described above, for example). The user then has the ability to view which database tables represented by the displayed database table icons 1225 are being affected by the current database event. It is contemplated that additional information about the current event affected the database tables represented by the database table icons 1225 could be displayed in this zoomed view.

Figure 13:
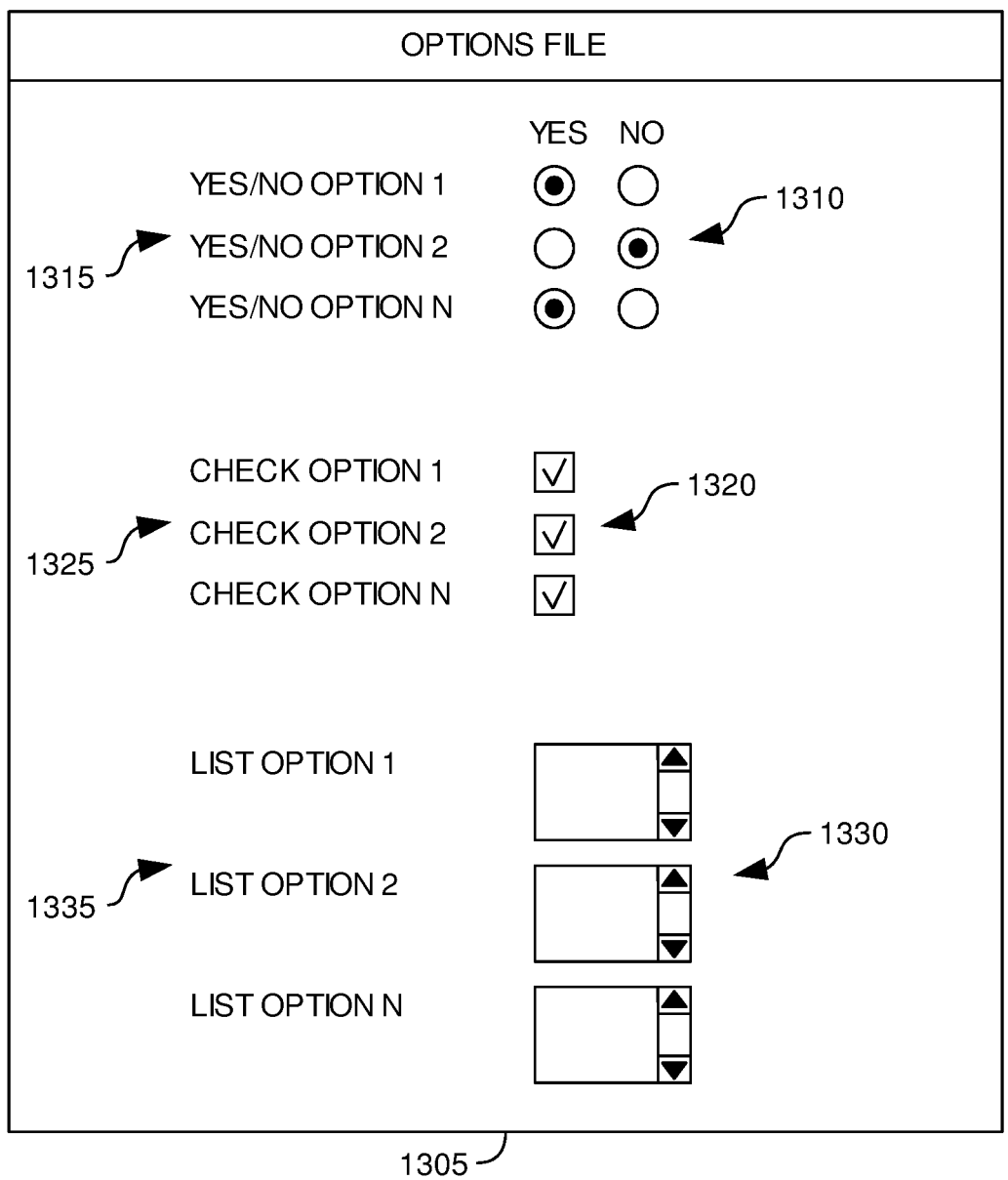
FIG. 13 is a relational view of software components of one embodiment of the invention.

FIG. 13 shows one embodiment of an option configuration screen 1305 of the dmr tool 205. Components described above will be identified by like reference numbers. In one embodiment of the invention, an option screen 1305 is provided to the user of the dmr tool 205. In one embodiment, the option configuration interface 1305 is accessed by clicking on the option button control object 455 (FIG. 4), as noted above with respect to the description of FIG. 4. n one embodiment, selections made via the option screen 1305 are saved to the options file 210, from which they can be subsequently retrieved and applied to configure the operation of the dmr tool 205. Thus, the user can use the option screen 1305 to configure a plurality of different options available in the dmr tool 205 for controlling the behavior of database table icons 415. FIG. 13 shows a plurality of Yes/No option questions $1315_1$, $1315_2$, $1315_N$ (three shown by way of example; collectively referred to as option question 1315) and a plurality of Yes/No option buttons $1310_1$, $1310_2$, $1310_N$ (three shown by way of example; collectively referred to as option buttons 1310). Examples of an option question 1315 might be "Display Flyover Text Balloons?", "Display Frequently Accessed Database Table Icons?", "Display CPU Resources", etc. FIG. 13 also shows a plurality of check box questions $1325_1$, $1325_2$, $1325_N$ (three shown by way of example; collectively referred to as check box question 1325) and a plurality of check boxes $1320_1$, $1320_2$, $1320_N$ (three shown by way of example; collectively referred to as check boxes 1320). Examples of a check box question 1325 might be "Blink Screen on Rollback", "Color-Code SQL Query", etc. . . . FIG. 13 also shows a plurality of list box questions $1335_1$, $1335_2$, $1335_N$ (three shown by way of example; collectively referred to as list box question 1335) and a plurality of list boxes $1330_1$, $1330_2$, $1330_N$ (three shown by way of example; collectively referred to as list boxes 1330). Examples of a list box question 1335 might be "Choose Color for SELECT Queries", "Choose Database User for Border Color", etc. . . . Each dbmon file 225 processed by the dmr tool 205 and displayed to the user in the graphic user interface display 410 could be based on the options chosen by the user on the option screen 1305. As such, valuable information needed by the user in the analysis of a particular dbmon file 225 could be obtained by modifying the options on the option screen 1305, re-processing the dbmon file 225 and watching the resulting series of database table icons 315 on the graphic user interface display 410.

CONCLUSION

By providing for the display of chronologically ordered database activity and interactions, using predefined playback controls, through a graphic user interface using a system of representative icons, embodiments of the present invention allow a user to see the effects of various internal and external events on the database. As a result, the user may be allowed to better optimize applications which interact with the database.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium containing a program which, when executed by a processor, performs operations for presenting chronologically ordered database information through a user interface, comprising:

displaying a graphical user interface having user-selectable graphical elements associated with predefined playback controls;

receiving user inputs with respect to the graphical elements to invoke the respective predefined playback controls;

in response to at least one of the user inputs, visually playing back, in the graphical user interface, a recording showing graphical objects being acted upon by chronologically ordered events within a period of time, such that a user observes visually recognizable changes occurring within the graphical user interface during playback of the recording; wherein the recording is based on information captured by one or more database monitors monitoring a database system comprising a plurality of databases and tables within each of the databases; wherein the graphical objects include at least representative icons for the plurality of databases and the tables within each of the databases, and wherein the visually recognizable changes shown during playback of the recording include an animated presentation of individual rows of the respective tables changing over time according to database operations being performed on the respective databases; and receiving user input selecting a button included with the playback controls configured to halt playback of the recording at a desired point in time and allow a user to examine a state of the database system at the desired point in time through interaction with the graphical user interface.

2. The non-transitory computer-readable storage medium of claim 1, wherein the operations further comprise playing back the recording according to predefined user selections that specify a manner in which the graphical objects are visually displayed in the user interface.

3. The non-transitory computer-readable storage medium of claim 1, wherein the operations further comprise playing back the recording in a manner allowing a user watching the recording in the graphical user interface to distinguish between different types of events acting on the graphical objects.

4. The non-transitory computer-readable storage medium of claim 3, wherein the different types of events acting on the graphical objects comprise database input/output operations comprising select operations, insert operations, delete operations and update operations.

5. The non-transitory computer-readable storage medium of claim 1, wherein the operations further comprise applying a plurality of customizable, visually discernable attributes to the representative icons in response to specific database events acting upon the respective tables, whereby a user watching the recording can determine the occurrence of the specific database events acting on the respective tables.

6. The non-transitory computer-readable storage medium of claim 1, wherein the operations further comprise receiving user input selecting the graphical elements in order to affect a location of the graphical icons within the user interface and a speed of the play back.

7. The non-transitory computer-readable storage medium of claim 1, wherein the operations further comprise manipulating the playback of the recording in response to user inputs selecting a fast-forward button and a rewind button included with the playback controls.

8. The non-transitory computer-readable storage medium of claim 1, wherein the operations further comprise receiving a user input selecting a button included with the playback controls configured to halt playback of the recording at a desired point in time and allow a user to examine a state of the database system at the desired point in time.

9. The non-transitory computer-readable storage medium of claim 1, wherein the operations further comprise displaying the graphical user interface which includes a configuration screen and further comprising receiving user input selecting configuration options from the configuration screen specifying a manner in which the events acting on the graphical objects will be visually displayed during playback of the recording so that different kinds of events will be visually discernable from one another.

10. The non-transitory computer-readable storage medium of claim 1, wherein the information is representative of the tables and the chronologically ordered events acting on the tables, and wherein playing back the recording comprises accessing a database monitor log containing the information.

11. A system for presenting chronologically ordered database event information in a user interface, comprising:
a processor and a memory wherein the processor is configured to:
display a graphical user interface having user-selectable graphical elements associated with predefined playback controls;
receive user inputs with respect to the graphical elements to invoke the respective predefined playback controls;
in response to at least one of the user inputs, visually play back, in the graphical user interface, a recording showing graphical objects being acted upon by chronologically ordered events within a period of time, such that a user observes visually recognizable changes occurring within the graphical user interface during playback of the recording; wherein the recording is based on information captured by one or more database monitors monitoring a database system comprising a plurality of databases and tables within each of the databases; wherein the graphical objects include at least representative icons for the plurality of databases and the tables within each of the databases, and wherein the visually recognizable changes shown during playback of the recording include an animated presentation of individual rows of the respective tables changing over time according to database operations being performed on the respective databases; and
receive user input selecting a button included with the playback controls configured to halt playback of the recording at a desired point in time and allow a user to examine a state of the database system at the desired point in time through interaction with the graphical user interface.

12. The system of claim 11, wherein one of the user-selectable graphical elements is a button corresponding to one of the playback controls and which, when selected, fast-forwards the playback of the recording and allows a user to review events in the database system at an accelerated rate.

13. The system of claim 11, wherein one of the user-selectable graphical elements is a button corresponding to one of the playback controls and which, when selected, rewinds the play back of the recording and allows a user to view events in the database system in reverse chronological order at an accelerated rate.

14. The system of claim 11, wherein one of the user-selectable graphical elements is a button corresponding to one of the playback controls and which, when selected, stops the playback of the recording at the desired point in time of the database system and allows a user to examine a state of the database system at the desired point in time.

15. The system of claim 11, wherein the graphical user interface includes a configuration screen which presents a plurality of configuration options; the configuration options specifying a manner in which graphical database event information is displayed in the graphical user interface.

* * * * *